(12) United States Patent
Ohta et al.

(10) Patent No.: US 9,518,708 B2
(45) Date of Patent: Dec. 13, 2016

(54) LIGHTING APPARATUS

(71) Applicant: PANASONIC CORPORATION, Osaka (JP)

(72) Inventors: Takashi Ohta, Osaka (JP); Atsushi Motoya, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 111 days.

(21) Appl. No.: 14/250,882

(22) Filed: Apr. 11, 2014

(65) Prior Publication Data

US 2014/0307447 A1  Oct. 16, 2014

(30) Foreign Application Priority Data

Apr. 12, 2013  (JP) .................................. 2013-083855

(51) Int. Cl.
*F21V 5/00* (2015.01)
*F21K 99/00* (2016.01)
(Continued)

(52) U.S. Cl.
CPC ............. *F21K 9/50* (2013.01); *B60Q 3/025* (2013.01); *F21V 5/002* (2013.01); *F21V 5/045* (2013.01);
(Continued)

(58) Field of Classification Search
CPC ............ F21K 9/50; F21V 5/002; F21V 5/045; B64D 47/02; B64D 2203/00; B64D 2011/0038; G02B 3/00; B60Q 3/025; F21Y 2101/00; F21Y 2103/10; F21Y 2115/10
See application file for complete search history.

(56) References Cited

U.S. PATENT DOCUMENTS 5,457,572 A * 10/1995 Ishii ...................... G03B 21/625
359/452
7,204,622 B2    4/2007 Dowling et al.
(Continued)

FOREIGN PATENT DOCUMENTS

JP    2005-537613    12/2005
WO   2004-021747    3/2004

OTHER PUBLICATIONS

U.S. Appl. No. 14/250,908 to Tadasi Nisimura et al., which was filed on Apr. 11, 2014.
(Continued)

*Primary Examiner* — Karabi Guharay
*Assistant Examiner* — Fatima Farokhrooz
(74) *Attorney, Agent, or Firm* — Greenblum & Bernstein, P.L.C.

(57) ABSTRACT

A lighting apparatus includes a plurality of LEDs arranged in a row; an elongated wiring board on which the LEDs are mounted; and an optical lens covering all the LEDs and controlling distribution of light emitted from each LED. The light emitted from each LED has an optical axis orthogonal to the wiring board. The optical lens is a converging lens and includes a first light incident surface on which the light emitted from the LED is incident, a medium that guides the light incident from the light incident surface, a light emitting surface, and a diffusion section that contains diffusing particles for causing the light incident from the LED to diffuse. The concentration of the diffusing particles in the diffusion section is high in the vicinity of the optical axis of the light emitted from the LED and gradually decreases as a distance from the optical axis increases.

4 Claims, 5 Drawing Sheets

(51) Int. Cl.
*F21V 5/04* (2006.01)
*G02B 3/00* (2006.01)
*B60Q 3/02* (2006.01)
*B64D 11/00* (2006.01)
*F21Y 101/00* (2016.01)

(52) U.S. Cl.
CPC ......... *G02B 3/00* (2013.01); *B64D 2011/0038* (2013.01); *B64D 2203/00* (2013.01); *F21Y 2101/00* (2013.01); *F21Y 2103/10* (2016.08); *F21Y 2115/10* (2016.08)

(56) References Cited

U.S. PATENT DOCUMENTS

| | | | | |
|---|---|---|---|---|
| 7,300,179 | B1* | 11/2007 | LaDuke | F21S 10/04 362/220 |
| 7,416,312 | B1* | 8/2008 | McDermott | F21V 5/046 362/216 |
| 2003/0193817 | A1* | 10/2003 | Yoneda | G01B 11/00 362/555 |
| 2004/0090787 | A1 | 5/2004 | Dowling et al. | |
| 2006/0290253 | A1* | 12/2006 | Yeo | G02B 5/0226 313/116 |
| 2007/0153514 | A1 | 7/2007 | Dowling et al. | |
| 2009/0122533 | A1* | 5/2009 | Brukilacchio | G02B 6/003 362/231 |
| 2011/0228534 | A1* | 9/2011 | Zhang | F21S 6/002 362/240 |
| 2011/0284885 | A1* | 11/2011 | Hong | H01L 33/56 257/88 |
| 2014/0071695 | A1* | 3/2014 | Chen | G02B 3/0056 362/311.02 |
| 2014/0177207 | A1* | 6/2014 | Lin | G02F 1/133606 362/97.1 |

OTHER PUBLICATIONS

U.S. Appl. No. 14/250,900 to Youji Tachino et al., which was filed on Apr. 11, 2014.
U.S. Appl. No. 14/250,888 to Takashi Ohta et al., which was filed on Apr. 11, 2014.

* cited by examiner

LONGITUDINAL
DIRECTION

TRANSVERSE
DIRECTION

LIGHTING APPARATUS

FIELD OF THE INVENTION

The present invention relates to a lighting apparatus that illuminates a ceiling in a cabin of an aircraft.

BACKGROUND OF THE INVENTION

Examples of lighting apparatuses provided in a cabin of an aircraft include: lighting apparatuses provided at a floor surface of an aisle at prescribed intervals; lighting apparatuses that locally illuminate passenger seats for passengers reading books or the like; and lighting apparatuses that illuminate a ceiling above the aisle. Among these lighting apparatuses, the brightness in the cabin is mainly controlled by the lighting apparatuses that illuminate the ceiling above the aisle.

In recent years, for improvement of fuel efficiency of aircrafts, not only the body of an aircraft but also various apparatuses installed in the cabin of the aircraft are required to be reduced in weight. For this purpose, a lighting apparatus for use in the cabin of an aircraft, which uses LEDs as light sources, has been known (refer to Patent Document 1, for example). In particular, many lighting apparatuses for illuminating the ceiling above the aisle are provided along the overall length of the cabin, and therefore, the use of compact and lightweight LEDs as light sources of each lighting apparatus contributes to reduction in the total weight of the aircraft.

Figure 9:
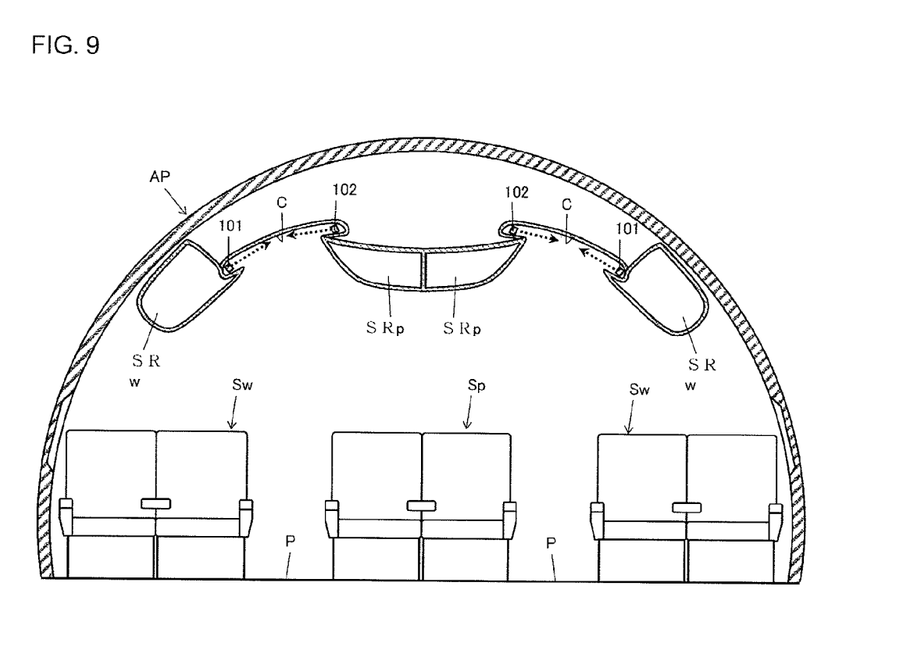
FIG. 9 is a cross sectional view showing the interior of a cabin of an aircraft in which general lighting apparatuses are installed.

FIG. 9 is a diagram showing an example of installation of lighting apparatuses of this type. In FIG. 9, lighting apparatuses 101 and 102 are used for illuminating a ceiling C above an aisle P in a cabin of an aircraft AP, and are provided above and along one side and the other side of the aisle P, respectively. The lighting apparatuses 101 and 102 are mounted to upper ends of overhead storage bins SRp and SRw above an aisle-side seat Sp and a window-side seat Sw, respectively, so as to be invisible from passengers sitting in the seats Sp and Sw. In FIG. 9, dashed arrows indicate optical axis directions of illuminating light emitted from the lighting apparatuses 101 and 102.

CITATION LIST

Patent Document

Patent Document 1: Japanese Laid-Open Patent Publication (Translation of PCT Application) No. 2005-537613

BRIEF SUMMARY OF THE INVENTION

Problems to be Solved by the Invention

Figure 10:
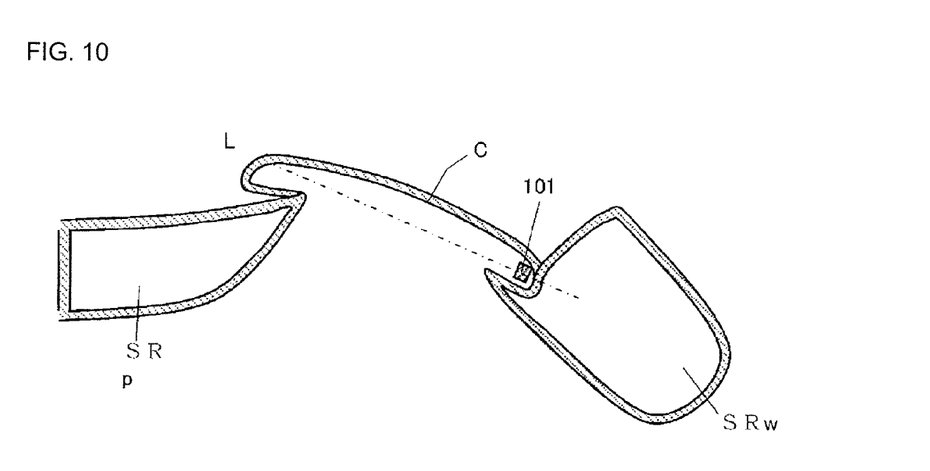
FIG. 10 is a partially-enlarged sectional view showing how a general lighting apparatus is mounted.

However, when two rows of lighting apparatuses 101 and 102 are provided for one aisle P as shown in FIG. 9, the total weight of the lighting apparatuses is great, and the total weight of the aircraft AP is increased by that weight, resulting in poor fuel efficiency of the aircraft AP. However, if each lighting apparatus 101 is mounted to the upper end of only the window-side storage bin SRw as shown in FIG. 10, the optical path length is increased in a direction (direction of an optical axis L of the lighting apparatus) from the lighting apparatus 101 to the ceiling C in the vicinity of the aisle-side storage bin SRp, and therefore, the area in the vicinity of the aisle-side storage bin SRp becomes dark. On the other hand, if an optical member having high convergence property in the direction of the optical axis L is used in the lighting apparatus 101, the ceiling C in the vicinity of the aisle-side storage bin SRp can be made bright. In this case, however, only this area is brightened as if illuminated with spotlight, and the entire ceiling C is not uniformly illuminated, which might deteriorate the appearance of the ceiling.

The present invention has been made to solve the above problems, and an object of the present invention is to provide a lighting apparatus that can uniformly illuminate the interior of a cabin of an aircraft even if less number of the lighting apparatuses than are conventionally used are provided in the cabin, and can contribute to reduction in the total weight of the aircraft and improvement of the fuel efficiency.

Solution to the Problems

The present invention is a lighting apparatus including: a plurality of LEDs arranged in a row; a wiring board having an elongated shape, on which the LEDs are mounted; and an optical lens that covers all the LEDs, and controls distribution of light emitted from each of the LEDs. The light emitted from each LED has an optical axis orthogonal to the wiring board. The optical lens is a converging lens, and includes a light incident surface on which the light emitted from the LED is incident, a medium that guides the light incident from the light incident surface, a light emitting surface that emits the light guided through the medium, and a diffusion section that contains diffusing particles for causing the light incident from the LED to diffuse. The concentration of the diffusing particles in the diffusion section is high in the vicinity of the optical axis of the light emitted from the LED and gradually decreases with a distance from the optical axis increases.

In the above lighting apparatus, preferably, the optical lens is configured to have a Fresnel structure at the light emitting surface.

In the above lighting apparatus, preferably, the optical lens further includes a translucent coating member that coats the light emitting surface, and the translucent coating member has a refractive index higher than a refractive index of the medium.

In the above lighting apparatus, preferably, the optical lens is configured to have a Fresnel structure at the light incident surface.

In the above lighting apparatus, preferably, the medium contains the diffusing particles to provide the diffusion section.

In the above lighting apparatus, the translucent coating member contains the diffusing particles to provide the diffusion section.

Effects of the Invention

According to the present invention, the lens converges light emitted from each LED in the direction of the optical axis of the light, while causing the light to diffuse around the optical axis because the concentration of the diffusing particles is high in the vicinity of the optical axis. Thus, the luminous flux is not concentrated in the direction of the optical axis. Therefore, for example, if the lighting apparatus is provided above and along one side of an aisle in a cabin, light emitted from the lighting apparatus can uniformly illuminate not only an area in the vicinity of the side where the lighting apparatus is provided but also an area in the vicinity of the other side of the aisle. Accordingly, it is possible to effectively illuminate the interior of the cabin with less number of lighting apparatuses as compared to the case where the lighting apparatuses are provided above and along the both sides of the aisle. Furthermore, the reduction in the number of the lighting apparatuses contributes to reduction in the total weight of the aircraft, and improvement of fuel efficiency.

DETAILED DESCRIPTION OF THE INVENTION

Figure 1:
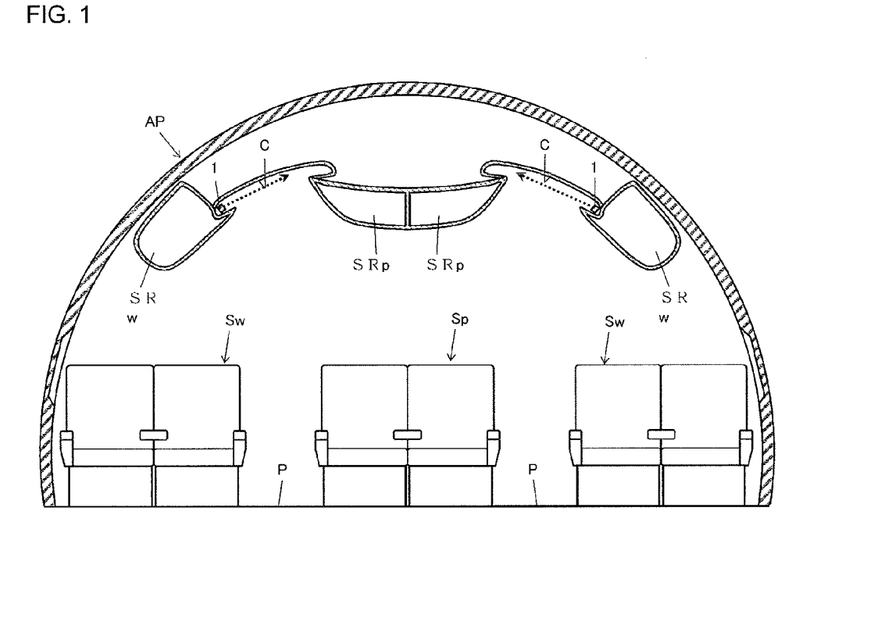
FIG. 1 is a cross sectional view showing the interior of a cabin of an aircraft in which lighting apparatuses according to an embodiment of the present invention are installed.

A lighting apparatus according to an embodiment of the present invention will be described with reference to FIGS. 1 to 6. As shown in FIG. 1, lighting apparatuses 1 are used for illuminating a ceiling C inside a cabin of an aircraft AP. The lighting apparatuses 1 are mounted to upper ends of overhead storage bins SRp and SRw located above an aisle-side seat Sp and a window-side seat Sw, respectively, along each of two passenger aisles P extending in the traveling direction of the aircraft AP. In FIG. 1, dashed arrows indicate optical axis directions of illuminating light emitted from the lighting apparatuses 1.

Figure 2:
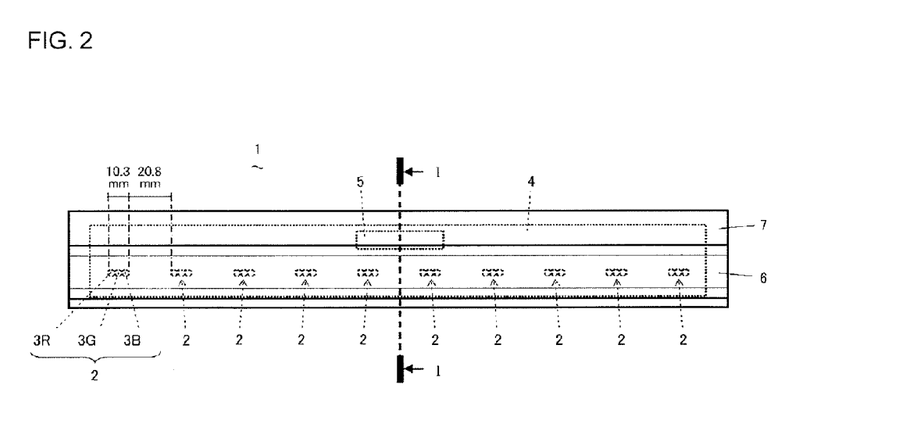
FIG. 2 is a top view of each of the lighting apparatuses.

As shown in FIG. 2, each lighting apparatus 1 has an elongated shape, and includes a plurality of LED units 2 arranged linearly. In FIG. 2, for example, ten LED units 2 are arranged at intervals of 20.8 mm. Each LED unit 2 includes three or more LEDs 3 (e.g., a red LED 3R, a green LED 3G, and a blue LED 3B) arranged in a row. The LEDs 3 are arranged at intervals of 0.5 mm such that the length of the LED unit 2 is 10.3 mm in the direction along which the LEDs 3 are arranged. Since the LED units 2 and the LEDs 3 are arranged as described above. efficient mixing of light is achieved between the LED units 2 as well as among the LEDs 3 in each LED unit 2.

Figure 3:
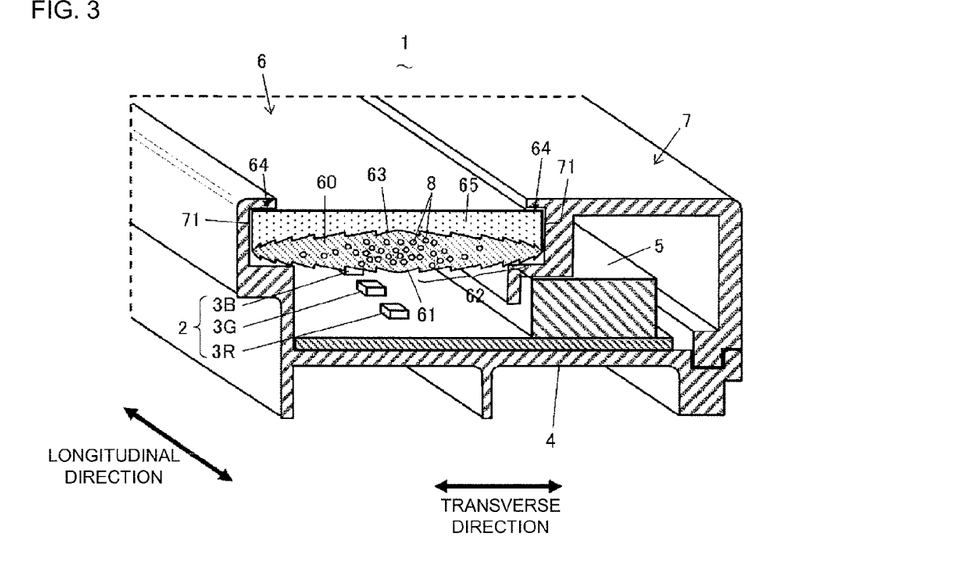
FIG. 3 is a perspective view including a cross section taken along a line I-I in FIG. 2.

As shown in FIG. 3, the lighting apparatus 1 includes: a wiring board 4 on which the LED units 2 are mounted; a drive circuit 5, mounted on the wiring board 4, for driving the LED units 2; and an optical member (optical lens; hereinafter referred to as "lens 6") for controlling distribution of light emitted from each LED unit 2. In addition, the lighting apparatus 1 includes a frame 7 that holds the above-mentioned components. The drive circuit 5 includes drivers (not shown) for individually driving the red LED 3R, the green LED 3G, and the blue LED 3B, respectively.

The lens 6 has an elongated shape that covers all the ten LEDs unit 2, and includes a medium 60 made of translucent resin such as polycarbonate, as a base. The lens 6 has a first light incident surface 61 on which light emitted from each LED unit 2 is incident, second light incident surfaces 62 provided outside the first light incident surface 61, and a light emitting surface 63 that emits light guided through the medium 60. Further, the lens 6 has a pair of flange portions 64 extending outward from both ends thereof in the transverse direction. The pair of flange portions 64 is slidingly inserted in a pair of grooves 71 provided along the longitudinal direction of the frame 7, and thus the lens 6 is detachably mounted to the frame 7. Further, the light emitting surface 63 and the flange portions 64, on the side opposite to the wiring board 4, are coated with a translucent coating member 65. The medium 60 contains diffusing particles 8 that cause the incident light from the LED unit 2 to diffuse, and serves as a diffusion section. Preferably, the diffusing particles 8 have a refractive index higher than that of the medium 60, and a difference between the refractive indices is about 0.17±0.02. The diffusing particles 8 are made of cross-linked acryl, for example. Preferably, the diffusing particles 8 are nanoparticles, and the mean particle diameter thereof is 0.8 to 2 nm.

Figure 4:
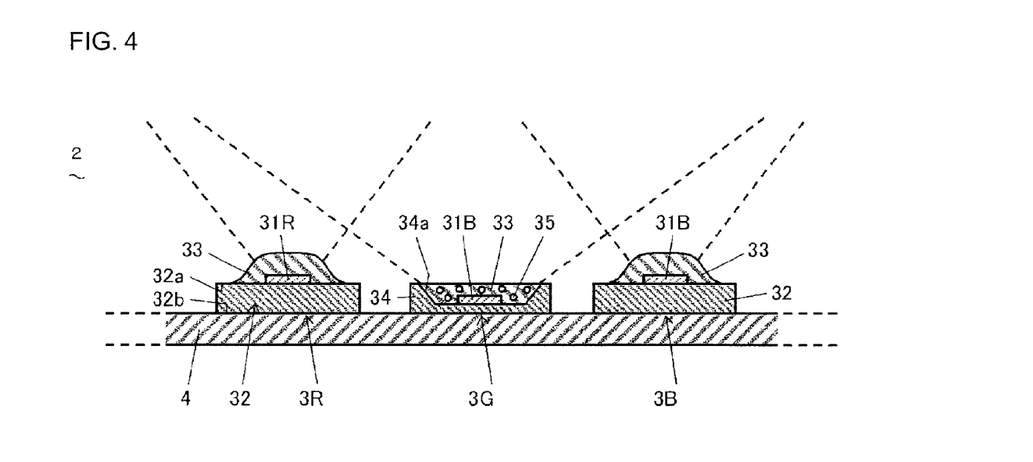
FIG. 4 is a cross sectional view of an LED unit as a component of the lighting apparatus.

As shown in FIG. 4, the red LED 3R includes a red LED chip 31R that emits red light, a base 32 on which the red LED chip 31R is mounted, and an encapsulant 33 that encapsulates the red LED chip 31R. The red LED 3R is mounted on the wiring board 4 via a mounting surface 32b of the base 32 on the side opposite to an LED-chip-mounted surface 32a of the base 32. The base 32 has a wiring (not shown) having one end connected to the red LED chip 31R and the other end led from the mounting surface 32b. The wiring led from the mounting surface 32b is connected to a wiring pattern (not shown) on the wiring board 4. The base 32 is made of a material excellent in heat conductivity and heat resistance, such as aluminum or ceramics.

The blue LED 3B is configured in the same manner as the red LED 3R, except having a blue LED chip 31B that emits blue light, instead of the red LED chip 31R.

The green LED 3G includes a blue LED chip 31B, a base 34 on which the blue LED chip 31B is mounted, and green phosphor 35 that is dispersed in the encapsulant 33 and performs wavelength conversion of blue light to green light. The base 34 has a recess 34a at the center thereof, and the blue LED chip 31B is disposed on the bottom surface of the recess 34a. Like the base 32 of the red LED 3R and the blue LED 3B, the base 34 also has a wiring (not shown), and the wiring connects the blue LED chip 31B to the wiring pattern (not shown) on the wiring board 4.

Generally, a green LED chip that emits green light has lower energy-to-light conversion efficiency and lower emission luminance than a blue LED chip or the like. The green LED 3G configured by the use of the blue LED chip 31B and the green phosphor 35 as described above has improved energy-to-light conversion efficiency and improved emission luminance as compared to a green LED configured by the use of a green LED chip.

The red LED 3R and the blue LED 3B configured as described above each have a relatively narrow light distribution angle (e.g., 80°), like a general LED. In contrast, the green LED 3G has a relatively wide light distribution angle (e.g., 120°) because the entirety of the encapsulant 33 including the green phosphor 35 acts like a light source that emits green light. The green LED 3G having the wide light distribution angle is disposed in the center (at an inner position) in the row of the LEDs 3 in the LED unit 2, and the red LED 3R and the blue LED 3B having the narrow light distribution angle are disposed at both ends of the row of the LEDs 3.

According to the above configuration, since the green LED 3G having the wide light distribution angle is disposed in the center, green light emitted from the green LED 3G is effectively mixed with red light and blue light emitted from the red LED 3R and the blue LED 3B adjacent to the green LED 3G. Therefore, color nonuniformity of illuminating light can be reduced. Further, since the drive circuit 5 individually drives the respective LEDs 3, the color of illuminating light emitted from the lighting apparatus 1 can be arbitrary controlled. Accordingly, it is possible to perform various kinds of artificial lighting, such as producing an atmosphere of early morning by illuminating the ceiling in the cabin with pale light, and producing an atmosphere of twilight by illuminating the ceiling with orange light.

Figure 5:
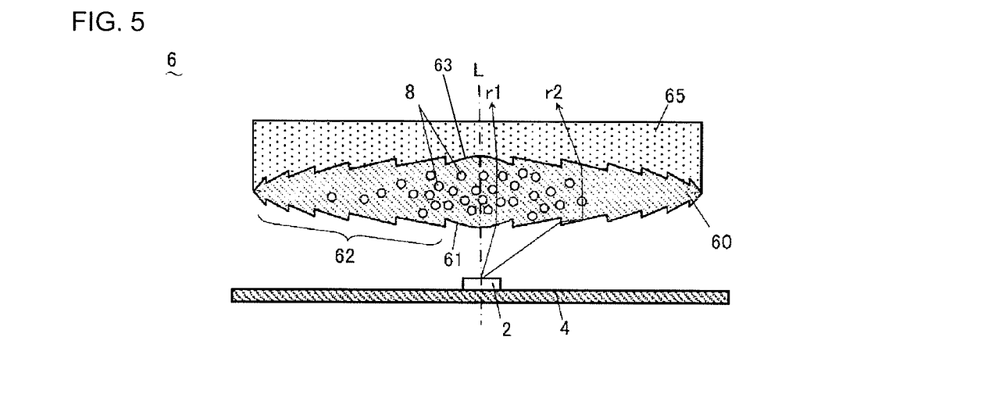
FIG. 5 is a side sectional view of a lens used in the lighting apparatus.

FIG. 5 shows a side sectional view of the lens 6 of the present embodiment. The first light incident surface 61 of the lens 6 has a curved surface convex toward the LED unit 2. In the cross section of the lens 6 shown in FIG. 5 (the cross section orthogonal to the longitudinal direction of the wiring board (refer to FIG. 3)), the concentration of the diffusing particles 8 is high in the vicinity of the optical axis L of the light emitted from the LED unit 2 and gradually decreases as the distance from the optical axis L increases. The second light incident surfaces 62 are formed outside and adjacent to the first light incident surface 61. The second light incident surfaces 62 are configured to have a Fresnel structure.

In the lens 6 thus configured, light r1 emitted from the LED unit 2 and incident on the first light incident surface 61 is refracted at the first light incident surface 61*a* having the convexly curved surface, guided through the medium 60, and again refracted at a portion of the light emitting surface 63 having a Fresnel structure. As a result, the light r1 incident on the first light incident surface 61 is refracted twice and converged in the direction of the optical axis L. Further, light r2 incident on the second light incident surface 62 is refracted and totally reflected at the second light incident surface 62, and again refracted at the Fresnel structure of the light emitting surface 63. As a result, the light r2 incident on the second light incident surface 62 is also converged in the direction of the optical axis L. Since the lens 6 is configured to have the Fresnel structure at the both surfaces, the overall thickness of the lens 6 is reduced, thereby realizing weight reduction of the lens 6 and size reduction of the lighting apparatus 1.

Since the light r1 and the light r2 incident on the first light incident surface 61 and the second light incident surface 62, respectively, are converged in the direction of the optical axis L, the luminous flux of the light emitted from the LED unit 2 is increased most in the direction of the optical axis L. In the lens 6 of the present embodiment, the concentration of the diffusing particles 8 contained in the medium 60 is high in the vicinity of the optical axis L of the light emitted from the LED unit 2 and gradually decreases as the distance from the optical axis increases. Therefore, the lens 6 causes the light from the LED unit 2 to diffuse around the optical axis L while converging the light in the direction of the optical axis L.

According to a general lens, if the light converging property of the lens is improved to increase the light transmittance thereof, nonuniformity is more likely to occur at a surface illuminated with light. On the other hand, if the light diffusing property is improved, such nonuniformity at the illuminated surface is less likely to occur, but the luminance at the illuminated surface is degraded. That is, there is a tradeoff between the transparency of the lens and the light diffusing property. In contrast, according to the lens 6 of the present embodiment, the light converging property of the lens 6 is improved by its own shape to improve the light transmittance of the lens 6. In addition, the concentration of the diffusing particles 8 is increased in the vicinity of the optical axis L where the luminous flux is increased to achieve the light diffusing property. Therefore, it is possible to achieve both the transparency of the lens and the light diffusing property.

Therefore, according to the present embodiment, the lens 6 converges the light emitted from the LED unit 2 in the direction of the optical axis L while causing the light to diffuse around the optical axis L because the concentration of the diffusing particles 8 is high in the vicinity of the optical axis, whereby the luminous flux is not concentrated in the direction of the optical axis L. Accordingly, if the lighting apparatus 1 is provided above and along one side of the aisle P in the cabin (refer to FIG. 1), light emitted from the lighting apparatus 1 uniformly illuminates not only an area in the vicinity of the side where the lighting apparatus is provided but also an area in the vicinity of the other side of the aisle P. Accordingly, it is possible to effectively illuminate the interior of the cabin with less number of lighting apparatuses as compared to the case where the lighting apparatuses are provided above and along both sides of the aisle P (refer to FIG. 10). Furthermore, the reduction in the number of the lighting apparatuses contributes to reduction in the total weight of the aircraft AP, and improvement of the fuel efficiency.

Further, since the diffusing particles 8 are used in the lens 6, incident light is guided in multiple directions in the lens 6, and light guided to the flange portions 64 is increased. However, in the lens 6 of the present embodiment, the Fresnel structure is provided extending from the light emitting surface 63 to the ends of the flange portions 64. Therefore, the light guided to the flange portions 64 can be converged to the optical axis L side, and light that has conventionally disappeared on the frame 7 side (refer to FIG. 3) can be taken out as effective light.

Figure 6:
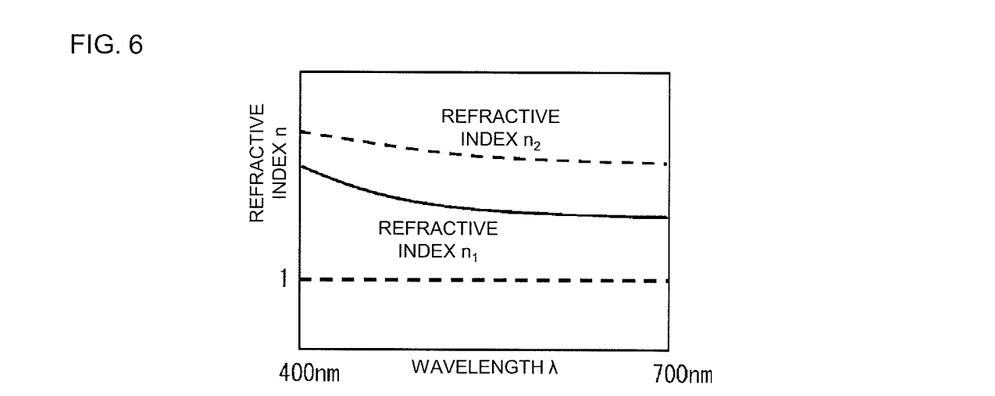
FIG. 6 is a graph showing the correlation between the refractive indices of materials of components of the lens and the wavelength.

Further, the light emitting surface 63 is coated with the translucent coating member 65. The translucent coating member 65 is made of a material having a refractive index $n_2$ higher than a refractive index $n_1$ of the medium 60. On the light emitting surface 63 having the Fresnel structure, diagonal planes and vertical planes of a sawtooth pattern are provided at prescribed intervals in the direction orthogonal to the optical axis L, and a boundary between the light emitting surface 63 and the medium 60 contacting the light emitting surface 63, i.e., an interface that causes a difference in refractive index, serves as a diffraction grating. Generally, a refractive index has wavelength dependence, and therefore, as shown in FIG. 6, a low refractive index material (refractive index: $n_1$) has a greater variation width in refractive index per wavelength as compared to a high refractive index material (refractive index: $n_2$). Therefore, for example, if a lens is made of the low refractive index material, light having a certain wavelength component is diffracted to cause interference fringes, which might cause nonuniformity of color at a surface illuminated with the light. Therefore, in the present embodiment, the light emitting surface 63 is coated with the translucent coating member 65 having the refractive index $n_2$ higher than the refractive index $n_1$ of the medium 60 to reduce the difference in refractive index at the interface of the light emitting surface 63, which makes it difficult to cause diffraction at any wavelength, thereby reducing nonuniformity of color of the illuminating light.

Figure 7:
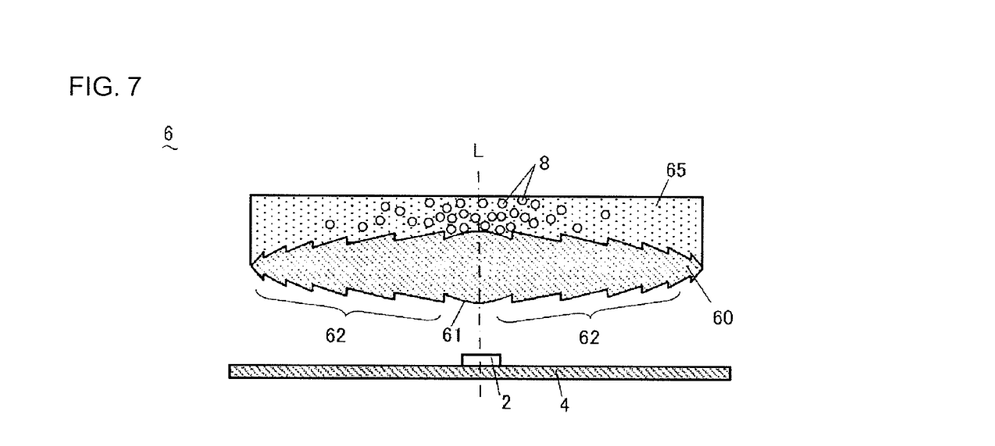
FIG. 7 is a cross sectional view of a lens used in a lighting apparatus according to a modification of the above embodiment.

Next, a lighting apparatus according to a modification of the present embodiment will be described with reference to FIG. 7. In the modification shown in FIG. 7, the translucent coating member 65 contains diffusing particles 8 to provide a diffusion section. This configuration facilitates production of the diffusion section. If a plurality of translucent coating members 65 having different concentrations of the diffusing particles 8 or gradients are produced and appropriately exchanged, it is possible to change the transparency of the lens 6 and the light diffusing property. Alternatively, the diffusion section may be a translucent coating member 65 having a surface on which diffusion dots are printed.

Figure 8A:
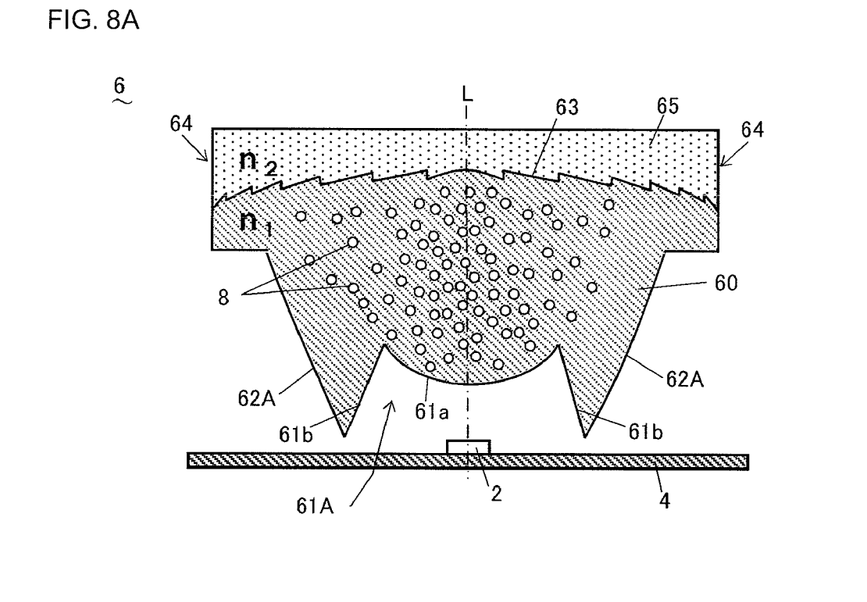
FIGS. 8A and 8B are cross sectional views of a lens used in a lighting apparatus according to another modification of the above embodiment.
Figure 8B:
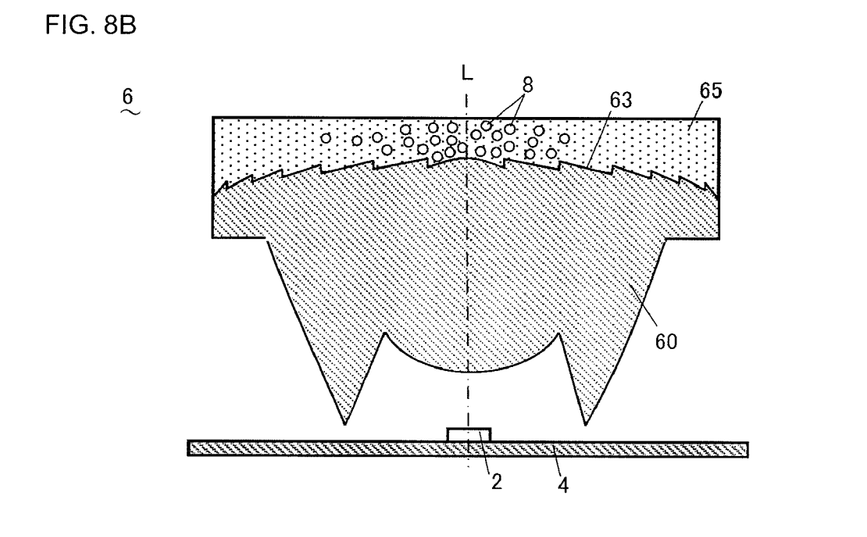

Next, a lighting apparatus according to another modification of the present embodiment will be described with reference to FIG. 8. In the modification shown in FIG. 8A, the lens 6 is formed to have a recess at a light incident surface 61A. The recessed light incident surface 61A has a bottom surface serving as a first light incident surface 61a on which light emitted from the LED unit 2 in the forward direction is incident, and has side surfaces of a cylindrical shape serving as second light incident surfaces 61b on which light emitted from the LED unit 2 at a wide angle is incident. The first light incident surface 61a is a curved surface convex toward the LED unit 2. Further, the lens 6 has total reflection surfaces 62A that are provided opposed to the second light incident surfaces 61b, and totally reflect the light incident from the second light incident surfaces 61b. Like in the above embodiment, in the cross section of the lens 6 shown in FIG. 8A (the cross section orthogonal to the longitudinal direction of the wiring board (refer to FIG. 3)), the concentration of the diffusing particles 8 is high in the vicinity of the optical axis L of the light emitted from the LED unit 2 and gradually decreases as the distance from the optical axis increases. Since the lens 6 is a general-purpose hybrid lens having a light emitting surface on which a Fresnel structure or the like is formed, it is easy to design and produce the lens 6. Also in this modification, the translucent coating member 65 may contain diffusing particles 8 to provide a diffusion section as shown in FIG. 8B.

The lighting apparatus according to the present invention is not limited to the above embodiment and the modifications thereof, and may be modified in various manners. For example, the lighting apparatus may include an LED that emits light of a color other than RGB. Specifically, the lighting apparatus may include a white LED that emits white light in addition to the RGB LEDs, and these LEDs may be individually subjected to dimming control. Since the lighting apparatus of the present invention is configured such that a difference in luminance according to a difference in optical path length hardly occurs between an area near the lighting apparatus and an area far from the lighting apparatus, the lighting apparatus is also applicable to an aircraft having a single aisle. However, in the case of a single aisle, symmetry of illumination is strongly demanded. Further, in terms of right and left weight balance of the aircraft, the lighting apparatus is preferably applied to an aircraft having two aisles.

DESCRIPTION OF REFERENCE CHARACTERS 1 lighting apparatus
2 LED unit
3 LED
4 wiring board
6 lens (optical lens; optical member)
60 medium (diffusion section)
61 first light incident surface (light incident surface)
61a first light incident surface (light incident surface)
61b second light incident surface (light incident surface)
62 second light incident surface (light incident surface)
63 light emitting surface
65 translucent coating member (diffusion section)
8 diffusing particles
L optical axis

The invention claimed is:

1. A lighting apparatus comprising:
a plurality of LED structures having a plurality of LEDs arranged in a row;
a wiring board having an elongated shape, on which the LEDs are mounted; and
an optical lens that covers the LED structures, and controls distribution of light emitted from each of the LEDs, wherein
each of the plurality of LED structures includes a plurality of LED types that each emit light of a different color from each other and are mounted on the wiring board in a row, and
the light emitted from each LED has an optical axis orthogonal to the wiring board,
the optical lens is a converging lens which has an elongated shape that covers all of the LEDs included in at least one of the LED structures, and includes a light incident surface on which the light emitted from the LED is incident, a medium that guides the light incident from the light incident surface, a light emitting surface that emits the light guided through the medium, and a diffuser that contains diffusing particles for causing the light incident from the LED to diffuse, and
the concentration of the diffusing particles in the diffuser is high in the vicinity of the optical axis of the light emitted from the LED and gradually decreases as a distance from the optical axis increases,
wherein the medium contains the diffusing particles to provide the diffuser.

2. The lighting apparatus according to claim 1, wherein the optical lens is configured to have a Fresnel structure at the light emitting surface.

3. The lighting apparatus according to claim 1, wherein the optical lens is configured to have a Fresnel structure at the light incident surface.

4. The lighting apparatus according to claim 2, wherein the optical lens further includes a translucent coating that coats the light emitting surface, and
the translucent coating has a refractive index higher than a refractive index of the medium.

\* \* \* \* \*